Oct. 6, 1970

T. M. MANSOUR 3,532,432

HEADLAMP AIMING APPARATUS AND METHOD

Filed Aug. 1, 1968

INVENTOR.
Tahir M. Mansour
BY John R. Faulkner,
Keith L. Zerschling
ATTORNEYS Oct. 6, 1970     T. M. MANSOUR     3,532,432

HEADLAMP AIMING APPARATUS AND METHOD

Filed Aug. 1, 1968     6 Sheets-Sheet 2

INVENTOR.
Tahir M. Mansour
BY John R. Faulkner,
Keith L. Zerschling
ATTORNEYS Oct. 6, 1970  T. M. MANSOUR  3,532,432
HEADLAMP AIMING APPARATUS AND METHOD
Filed Aug. 1, 1968  6 Sheets-Sheet 4

INVENTOR.
Tahir M. Mansour
BY John R. Faulkner,
Keith L. Zerschling
ATTORNEYS

United States Patent Office 3,532,432
Patented Oct. 6, 1970

3,532,432
HEADLAMP AIMING APPARATUS AND METHOD
Tahir M. Mansour, Livonia, Mich., assignor to Ford Motor Company, Dearborn, Mich., a corporation of Delaware
Filed Aug. 1, 1968, Ser. No. 749,428
Int. Cl. G01j 1/00
U.S. Cl. 356—121                                     20 Claims

ABSTRACT OF THE DISCLOSURE

A headlamp aiming apparatus and method in which the high intensity zone of the low-beam headlamp of an automotive vehicle may be properly aimed and positioned on a headlamp aiming board. The aiming board may include light sensitive or photoelectric means positioned properly with respect to a properly positioned edge of the high intensity zone and means are coupled to the light sensitive or photoelectric means located on the aiming board for computing the approximate third derivative of the light intensity with respect to the distance scanned as the edge of the high intensity zone is scanned over the light sensitive or photoelectric means located on the board. When the approximate third derivative becomes zero, the high intensity zone of the low-beam headlamps is properly positioned and aimed.

Other means, preferably in the form of single line iconoscopes may be employed for producing a signal proportional to light intensity. This signal may be acted upon to produce the exact third derivative of the light intensity with respect to distance scanned. When this exact third derivative is zero, the high intensity zone of a low-beam headlamp is properly aimed and positioned.

BACKGROUND OF THE INVENTION

The basic regulatory code used by most state, federal, and local regulating agencies relating to the aiming of automobile vehicle headlamps is that described as the Lighting Inspection Code—SAE J599a: SAE Recommended Practice, which appears on pages 735–737 of the Society of Automotive Engineers 1964 SAE Handbook. With respect to the aiming of the low-beam or city driving lamps of the automotive vehicle, it states that beams should be inspected for aim either (1) on a screen at a distance 25′ ahead of the headlamps, or (2) with inspection equipment which gives essentially equivalent results, of (3) with a mechanical headlamp aimer when the vehicle headlamps are mechanically aimable.

If a screen is to be used, it must be of adequate size and spaced at a distance of 25′ from the lamp to be aimed. The light pattern projected from the lamp is viewed on this aiming screen which has target lines marked on its surface for use in visual evaluations of the aiming. The code described above states that for vertical aim of the low beam, the top edge of the high intensity zone shall be located along a horizontal centerline located at the level of the lamp center within limits of plus or minus 2″. For lateral or horizontal aiming, the left edge of the high intensity zone shall be located 2″ to the right of the vertical centerline located straight ahead of the lamp center within limits of 4″ to the right and 2″ to the left of the desired position. Each projected light pattern must be examined visually by the operator and the position of the high intensity zone relative to the aiming target lines on the screen must be evaluated and adjusted to provide proper aiming in the judgment of the operator.

An alternate means for inspecting for low-beam aim may be with a mechanical headlamp aimer which can be used with mechanically aimable headlamps. This mechanical headlamp aimer must comply with the code mentioned above, and it ordinarily includes devices that rest against three aiming pads on the headlamp face lens. The system depends generally upon bubble level indicators or other mechanical means to indicate proper headlamp adjustment. The accuracy of this method of aiming the low beams is highly dependent upon precise monitoring and control of the relationship between the position of the aiming pads and the projected light pattern at the time of bulb manufacture.

Automotive headlamps are usually aimed in assembly plants by visually examining the light pattern projected on a target board aiming screen at the required distance of 25′, and adjusting these lamps by manual means to conform to the Society of Automotive Engineers Recommended Practice as brought out above. A few assembly plants, however, do use the mechanical aiming devices described above. The primary difficulties associated with the visual system are due to the variations in the operator's interpretation of the position of the top and left edges of the high intensity zone relative to the horizontal and vertical aiming target lines on the screen. Added to this are the inherent problems of operator fatigue, attitude, visual acuity and other human frailties. Even under the best conditions, variations in the quality of the aiming of the headlamps by the visual system do exist.

It is apparent, therefore, that there is a need for a new system for aiming headlamps that will eliminate or minimize the variations described above and that will eliminate or substantially reduce the disadvantages that are inherent in both the visually based system and the mechanical system described above. It is essential that such a system be capable of accurately and consistently interpreting the positions of the high intensity zone of the projected light pattern from the low-beam headlamp. It must indicate the direction of adjustment necessary for proper alignment and must indicate when proper adjustment has been achieved.

The basic difficulty in determining this edge instrumentally has been caused by the general tendency of this area (i.e. the edge) to be gradient in character rather than the less complex situation consisting of immediately adjacent illuminated and non-illuminated areas. Further, the general character of this gradation in light intensities varies considerably between individual lamps and lamps of difference manufacture.

The primary requirement for objectively aiming low beam type headlamp light patterns is a valid objective definition of what constitutes the "edge" characteristic of the high intensity zone used in the visual aiming process. In U.S. Pat. 3,386,333, issued June 4, 1968 in the name of Bruce W. Preston, and addressed to the assignee of this invention, this characteristic of the light pattern is represented by an empirical ratio of intensities of immediately adjacent areas, taking into account the background or ambient light. In the patent referenced above, three light sensitve devices are used to register the light intensities, and the location of the edge of the high intensity zone is determined by scanning the light pattern and searching for a minimum value of this ratio. While the invention disclosed and claimed in that patent will satisfactorily aim a low beam headlamp, it has the disadvantage of requiring the search for the location of an unpredictable minimum value, whose detection necessitates over-shooting that location and subsequent re-search. This operational disadvantage is further amplified when the locations of two interrelated minima (one for the top edge and one for the left edge of the high intensity zone) have to be attained simultaneously.

An analytical definition of the edge of a gradient light pattern (such as that of a low beam headlamp) can be based upon the rate of change of the intensity gradient. Here, this edge is characterized as that point where the intensity gradient changes at the highest (maximum) rate. This rate of change can be mathematically represented by the second derivative of intensity with respect to distance. An aiming technique using the second derivative, however, also requires scanning and searching for a maximum. (See U.S. patent application 421,422 filed Dec. 28, 1964 in the name of Brue W. Preston and assigned to the assignee of this invention.) While the headlamp aiming apparatus and method of that application will satisfactorily aim a low beam headlamp, the requirement for scanning and searching for a maximum presents the same operational disadvantages connected with the ratio based technique referenced above.

In the present invention, the edge of the low beam light pattern is mathematically characterized as that point where the third derivative of light intensity with respect to distance attains a value of zero. This facilitates the use of the more desirable null type indicating system which substantially eliminates the disadvantages and inherent inaccuracies of the various other systems described above.

The inventor has found, based upon verification by quantitative measurements, a high level of correlation between the visual interpretation of the location of the edge of the high intensity zone and the mathematical representation of this edge as the point where the third derivative of intensity with respect to distance attains a value of zero, when measured in a direction substantially perpendicular to the left or top boundary of the light pattern.

The lighting codes mentioned above require that the edges, horizontal and vertical, of the high intensity zone of a low-beam light pattern from an automotive headlight be located in a certain position with respect to horizontal and vertical lines on a headlamp aiming board. The present invention provides a system and means for locating these edges and for adjusting the low-beam headlamp pattern such that the edges are in a proper position by using the third derivatives or approximate third derivatives of intensity with respect to distance in directions substantially perpendicular to these edges.

There is also a need in the art for a reliable, fast and convenient way for checking the exact position of the mechanical aiming pads on a headlamp with respect to its projected light pattern when mechanical aiming of headlamps is employed. The present invention is admirably suited for this purpose.

SUMMARY OF THE INVENTION

In one embodiment of the invention, the third derivative may be derived by use of a scanning means which will scan and sense the light intensity in the region of a properly positioned edge of a high intensity zone along a line substantially perpendicular to the edge. The output from the sensing means may be applied to a first differentiator, then to a second differentiator and then to a third differentiator to compute the third derivative of the light intensity with respect to distance, and the output from the third differentiator may be fed to an aim indicating meter. With the sensing means properly indexed with respect to a line on the aiming board which indicates the position of the edge of a properly aimed high intensity zone of a low-beam light pattern, the headlights are adjusted until the indicating meter reads zero thereby indicating that the value of the third derivative of light intensity with respect to distance scanned is zero at this line. It should be apparent that this system is applied to both the horizontal and the vertical edges (the upper and the left-hand edge respectively) of the low-beam headlamp pattern.

In the alternative, means may be employed to automatically adjust the high intensity zone of a low-beam headlamp into proper position. In order to do this, servo units are electrically coupled to the third differentiators in both the horizontal and vertical arrangements for adjusting the horizontal and vertical edges of the high intensity zone. These servo units include adjusting tools that may be applied to the headlamp adjusting means.

The servo units include means for automatically driving the adjusting screws of the headlamp so that the light pattern may be scanned from one extreme position, for example, to the left of the properly aimed position of the vertical edge of the light pattern to another extreme position, for example, to the right of the properly aimed position. As this happens, a sensing means will sense the variation in light intensity and a signal will be produced by the third differentiators that is proportional or representative of the third derivative of the light intensity with respect to distance. When the signal from the third differentiator is zero, the servo unit will stop and the high intensity zone of the low-beam headlamps will be in a proper horizontal or lateral position.

The above system can also be used with a manual screw driver rather than a servo unit and with an indicating lamp that will automatically light when the low-beam headlamp has been adjusted so that the third derivative is zero.

This same apparatus and procedure, as mentioned above, may be applied to the adjustment of the vertical positioning of the high intensity zone of the low-beam headlamp with the difference, of course, that the scanning and movement of the light pattern takes place in a vertical direction substantially perpendicular to the upper horizontal edge of the high intensity zone of this light pattern.

The inventor has found that the third derivative of light intensity with respect to distance may be computed on an approximate basis to give results that are acceptable and are very close to the results that could be obtained with the system described above in which the exact differentiation of the light intensity with respect to distance is accomplished. In order to do this, he has mathematically derived the following expression for approximating the third derivative of light intensity with respect to distance:

$$D_3 = I_1 - 3(I_2 - I_3) - I_4$$

where $D_3$ is the approximate third derivative, $I_1$, $I_2$, $I_3$ and $I_4$ are intensity values from four consecutive and equally spaced points on the intensity distribution curve of the headlamp light pattern. The values $I_1$, $I_2$, $I_3$ and $I_4$ are derived from four adjacent and equally spaced light sensitive devices or photoreceptors positioned on the aiming board.

The four light sensitive devices or photoreceptors are positioned on the aiming board in a direction substantially perpendicular to the direction of the edge of the high intensity zone to be aimed. In a practical system, therefore, for aiming the upper edge and the left edge of the high intensity zone of a low-beam light pattern, four light sensitive devices or photoreceptors are positioned in a vertical line with the midpoint between the two outer ones positioned on the aiming board in the required position for the upper edge of the high intensity zone, while another set of four transducers or light sensitive devices is positioned along a horizontal line substantially perpendicular to the left-hand edge of the high intensity zone and similarly centered on the line on the aiming board which denotes or indicates the proper position of the left-hand edge of the low-beam light pattern.

The output from each of the four photoreceptors or light sensitive devices in each set is fed through a computer amplifier that computes the approximate third derivative, $D_3$, for each set and feeds these values to horizontal and vertical aim indicating meters. As discussed with the previous embodiment, the low-beam headlamp pattern may then be adjusted to bring the horizontal aim indicating meter and the vertical aim indicating meter to a null (zero) reading which indicates a zero value of the approximate third derivative. Also, in this case, the servo unit arrangement may be used, as well as, the lighting arrangement in which a light may be lighted when the approximate third derivative is nulled during the scanning adjustment of the low-beam headlamp pattern over the set of light sensitive devices or photoreceptors.

The present invention may also be used to check the position of the faces of mechanical aiming pads positioned on the lens of headlamps so that mechanical aiming devices may be used in automotive assembly plants to aim properly the low beam light pattern from the headlamps.

An object of the present invention is the provision of an apparatus and method for aiming the low-beam headlamp pattern of an automotive vehicle that is fast in operation and that eliminates the disadvantages inherent in the visual method of aiming the headlamps.

Another object of the invention is the provision of a method and system for aiming of low-beam headlamps of an automotive vehicle which is very rapid and accurate and will substantially eliminate aiming inaccuracies that may occur in the use of the visual method.

A further object of the invention is the provision of a system and method for accurately aiming the low-beam headlamps of an automotive vehicle that simulates the physiological process used in visual aiming of headlamps, and that gives essentially equivalent or more accurate results in the aiming of the low-beam headlamp pattern of an automotive vehicle.

Another object of the invention is the provision of a system and method for properly ascertaining the mechanical aiming of headlamps.

Other objects and attendant advantages of the present invention will be more readily apparent as the specification is considered in connection with the attached drawings.

DESCRIPTION OF THE PREFERRED EMBODIMENT

The invention will be described and is illustrated in relation to a four-lamp headlight system in which 5¾" type 2 sealed beam headlamps are used for providing the low-beam light pattern or illumination when the vehicle operator has his dimmer switch positioned for low-beam operation. It is to be understood, however, that this system is equally applicable to headlamp systems for automotive vehicles which employ two headlamps only. In the latter system, a 7" sealed beam headlamp is used that employs a pair of filaments, one of which is energized when the lamp is switched to its low-beam position. It should be understood also that although the system is illustrated with horizontally arranged double headlamps on either side of the vehicle, that it may be equally employed with vertically arranged headlamps positioned on either side of the vehicle. The positioning of the various target lines on the target board, as described subsequently, is dependent on the spacing of the headlamps in the vehicle and on their vertical location with respect to the target board. The position of these target lines dictates the position of the light sensitive devices or photoreceptors.

Figure 1:
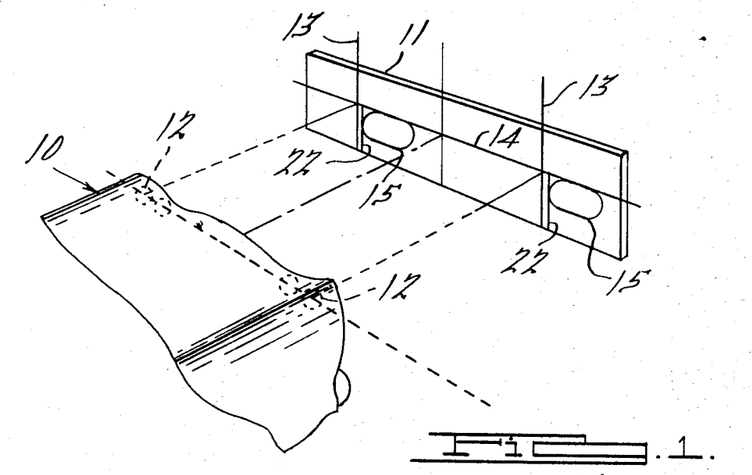
FIG. 1 is a schematic view of an automative vehicle shown in proper position in relation to a vehicle headlamp aiming board.

Referring now to the drawings in which like reference numerals designate like parts throughout the several views thereof, there is shown in FIG. 1 an automotive vehicle 10 positioned properly before a headlamp aiming screen or target board 11. As previously pointed out, the distance between the headlamps to be aimed and the headlamp aiming screen or target board is 25'. The low-beam headlamps of the headlamp system to be properly aimed, as shown here, are the outboard lamps 12 on either side of the vehicle. As shown on the headlamp aiming screen or target board 11, a vertical line 13 is positioned on the headlamp aiming screen or target board 11 on each side thereof which is a projection of a vertical line through the centerline of each of the lamps 12. A horizontal line 14 is also positioned on the headlamp aiming screen or target board 11, and this line is a projection of the horizontal centerline through the center of the lamp 12.

Figure 2:
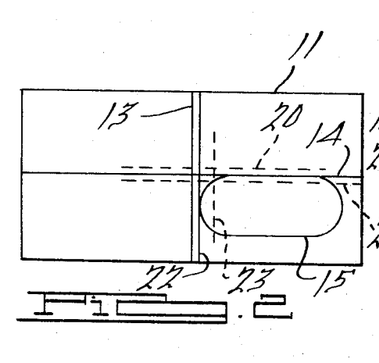
FIG. 2 discloses the high intensity zone of one low-beam headlamp properly positioned on a vehicle headlamp aiming board with respect to projected horizontal and vertical lines through the centerline of the low-beam headlamp.

Turning now to FIG. 2 which discloses one-half of the headlamp aiming screen or target board 11, the standards for aiming a low-beam headlamp 12 will be discussed. It is to be understood that the discussion relative to FIG. 2 applies equally to the low-beam headlamp 12 located on the right-hand side of the vehicle and the low-beam headlamp 12 located on the left-hand side of the vehicle. The high intensity zone of the low-beam headlamp 12 is indicated by the generally oblong pattern 15. The SAE standards mentioned above state that the upper edge of the high intensity zone should be located on the horizontal line 14 which represents the level of the center of the lamp 12. The aiming of the low-beam headlamp in a vertical direction is unsatisfactory if the edge of this high intensity zone is more than 2" above the horizontal centerline 14 or more than 2" below it as indicated by the dashed lines 20 and 21.

In the lateral aiming of the low-beam headlamp 12, the left edge of the high intensity zone 15 should be located on a vertical line 22 located 2" to the right of the vertical line 13 which is a projection of a vertical line through the center of the lamp 12. Aiming is unsatisfactory if this edge is more than 4" to the right of the vertical line 22 as represented by the dashed line 23 or more than 2" to the left of the vertical line 22 which would be at the position of the projected vertical centerline of the lamp 12 as represented by the vertical line 13.

Figure 3:
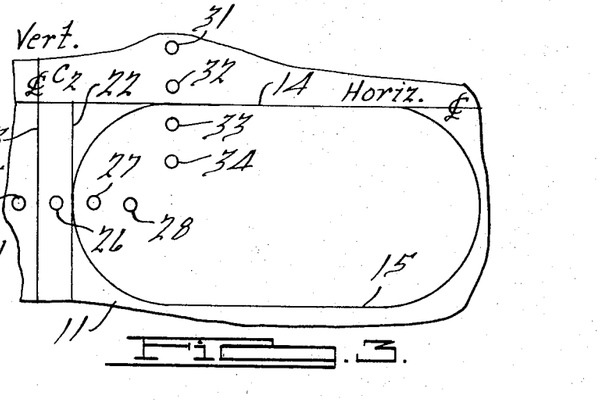
FIG. 3 shows the position of the horizontal and vertical set of light sensitive devices or photoreceptors of the present invention when mounted on the headlamp aiming board shown in FIGS. 1 and 2 and in relation to the high intensity zone of a low-beam headlamp.

Referring now to FIG. 3, there is shown a first group of four light sensitive devices or photoreceptors 25, 26, 27 and 28 positioned at equally spaced increments on a horizontal line parallel to the projected horizontal centerline of the lamps 12 as represented by the line 14. It has been found that the optimum spacing between these light sensitive devices is 3"; however, other equally spaced increments, for example, between 2" and 5" may be used.

Using the optimum spacing described above, the first photoreceptor or light sensitive device 25 is positioned 4½" to the left of the vertical line 22 that marks the correct position of the left edge of the high intensity zone of a properly aimed low-beam headlamp. It can be appreciated also that this photoreceptor or light sensitive device is positioned 2½" to the left of the projected vertical centerline 13 of the lamp 12. It is also located 7" below the projected horizontal centerline 14 of the lamp 12. The photoreceptor or light sensitive transducer 26 is positioned 3" to the right of photoreceptor or light sensitive device 25 and is, therefore, positioned 1½" to the left of line 22 that marks the left edge of a high intensity zone of a properly aimed headlamp. The third and fourth light sensitive devices or photoreceptors 27 and 28 are positioned 1½" and 4½" to the right of line 22, respectively.

Four additional photoreceptors or light sensitive devices 31, 32, 33 and 34 are positioned on a vertical line located 7" to the right of the vertical line 22 and hence 9" to the right of the vertical line 13 through the centerline of the low-beam headlamp 12. The position of these light sensitive devices or photoreceptors using the optimum spacing of 3" between them is described below. The first photoreceptor or light sensitive device 31 is positioned 4½" above the horizontal centerline 14, the second light sensitive device or photoreceptor 32 is positioned 1½" above the horizontal line 14, the third light sensitive device or photorecepter 33 is positioned 1½" below the horizontal line 14, and the fourth light sensitive device or photoreceptor 34 is positioned 4½" below the horizontal line 14.

Figure 4:
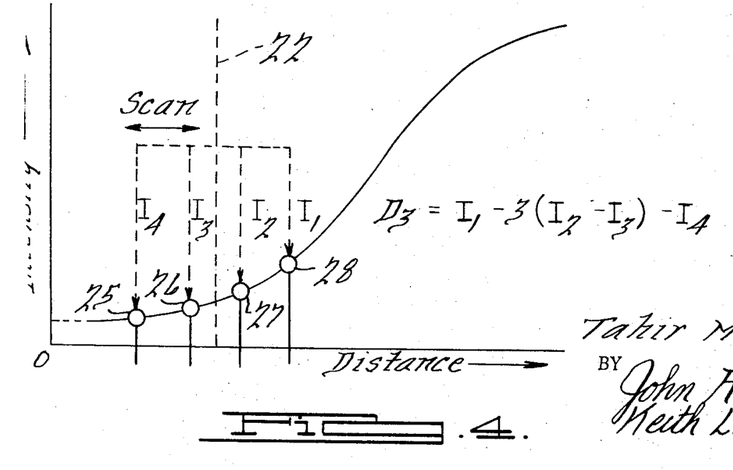
FIG. 4 shows a distribution of the light intensity with respect to distance scanned in either a horizontal or vertical direction along the position of the vertical or horizontal sets of light sensitive devices or phototransducers shown in FIG. 3.

Referring now to FIG. 4 which is a curve of the light intensity versus horizontal distance starting to the left of the high intensity zone 15, for example, to the left of vertical centerline 13 into the highest intensity portion of the high intensity zone 15, the location of the horizontal light sensitive devices or photoreceptors 25, 26, 27 and 28 can be seen relative to the light distribution curve of a properly aimed low-beam headlamp. The light intensity received by the light sensitive device or photoreceptor 25 is denoted by $I_4$, the light intensity received by the light sensitive device or photoreceptor 26 is denoted $I_3$, the light intensity received by the light sensitive device or phototransducer 27 is denoted $I_2$, and the light intensity received by the light sensitive device or photoreceptor 28 is denoted $I_1$. It can be readily appreciated that the four photoreceptors or light sensitive devices 25, 26, 27 and 28 are fixed on the lamp aiming board or target screen 11 as described in relation to FIG 3 and that the light intensity distribution curve shown is shifted horizontally as horizontal adjustment of the low-beam light pattern from headlamp 12 is accomplished. This curve applies equally to light distribution with respect to distance in a vertical direction, with the curve starting above the top edge of the high intensity zone and extending downwardly into it and the four light sensitive devices or photoreceptors 25 through 28 replaced by the four light sensitive devices or photoreceptors 31 through 34.

As was previously stated, it has been found that when the approximate third derivatives of light intensity with respect to a distance measured substantially perpendicular to the edges of the high intensity zone are zero at the lines 22 and 14, the edges of the high intensity zone are properly positioned, and hence, the low-beam light pattern is properly aimed. Thus, when the quantity $$D_3 = I_1 - 3(I_2 - I_3) - I_4$$

is zero at the lines 22 and 14, where as previously stated, $D_3$ is approximate third derivative of light intensity with respect to distance, the low-beam headlamp pattern is aimed properly.

Figure 5:
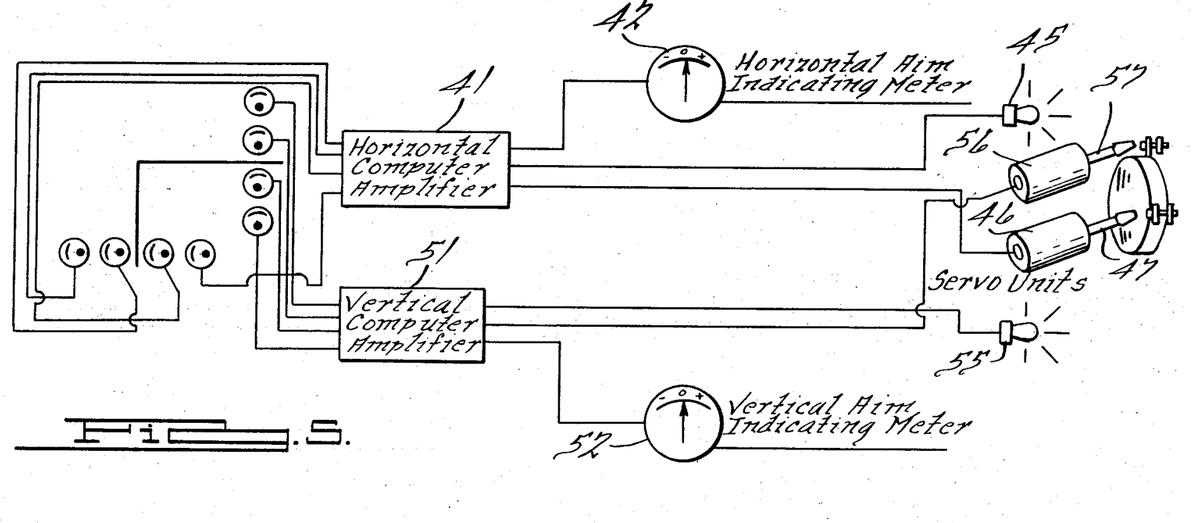
FIG. 5 is a block diagram or schematic of the apparatus of the present invention using or employing the approximate third derivative of light intensity with respect to distance for properly aiming the low-beam headlamp of an automotive vehicle.
Figure 6:
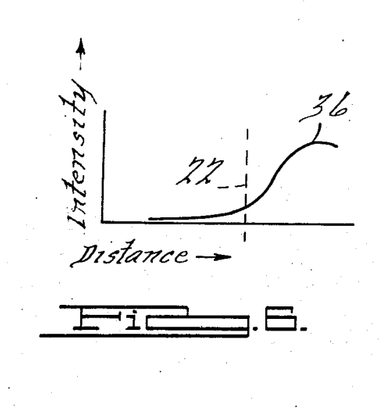
FIG. 6 is a plot of a light intensity curve from a headlamp versus distance similar to FIG. 4.
Figure 7:
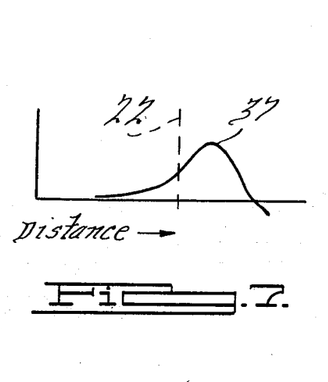
FIG. 7 is a plot of the first derivative of the light intensity curve of FIG. 6.
Figure 8:
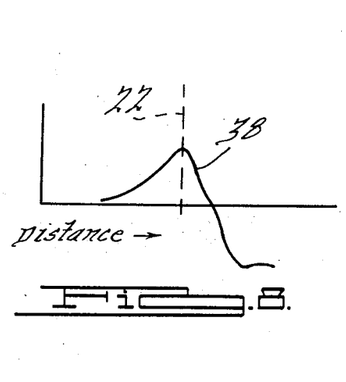
FIG. 8 is a plot of the second derivative of the light intensity curve of FIG. 6.
Figure 9:
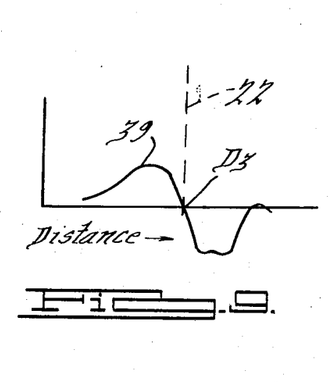
FIG. 9 is a plot of the third derivative of the light intensity curve of FIG. 6.

Means for computing this approximate third derivative, $D_3$, and indicating its value are shown in FIG. 5. Positioned below FIG. 5 are four curves, the first of which is shown in FIG. 6 and is denoted by the numeral 36. This curve is a plot of the intensity of the light from a properly aimed low-beam headlamp pattern versus distance taken along lines that run through either the horizontal set of light sensitive devices or photoreceptors 25 through 28 or the second set of light sensitive devices or photoreceptors 31 through 34. The second curve 37, shown in FIG. 7, represents the first derivative of light intensity with respect to these distances; the third curve 38, shown in FIG. 8, represents the second derivative of light intensity; and the fourth curve 39, shown in FIG 9, represents the third derivative of light intensity along these distances. The fourth curve 39 is approximated by the quantity $D_3 = I_1 - 3(I_2 - I_3) - I_4$. The outputs from the four horizontal light sensitive devices or photoreceptors 25, 26, 27 and 28 are connected to a horizontal computer amplifier 41 which computes and amplifies the approximate third derivative, $D_3$, from the values $I_1$, $I_2$, $I_3$ and $I_4$ that represent the intensities of the light incident on the light sensitive devices or photoreceptors 25, 26, 27 and 28, respectively. The horizontal computer amplifier 41 may be connected to a horizontal aim indicating meter 42 which will indicate when a zero value of the approximate third derivative $D_3$ is achieved.

Thus, if the headlamp aiming operator wishes to manually adjust the headlamp as described subsequently, he may do so by a manually operated screw driver on an adjusting nut or bolt coupled to the headlamp. He may adjust the nut or bolt until the horizontal aim indicating meter 42 reads zero thus indicating a zero value of the approximate third derivative, $D_3$, and proper aiming in a horizontal or lateral direction of the high intensity zone 15 of the low-beam headlamp 12 in which the left edge of the high intensity zone is positioned on the line 22.

Means may be provided also to indicate in an additional way the proper aiming of the high intensity zone 15 in a horizontal direction, and means may also be provided for automatically aiming the low-beam light pattern from the headlamp 12. In order to do this, a lamp 45 is connected to the horizontal computer amplifier 41. The horizontal computer amplifier may also be connected to a servo unit 46 having a rotatable shaft to which is connected a screw driver or other adjusting tool 47.

The vertical photoreceptors or light sensitive devices 31, 32, 33 and 34 are connected to a vertical computer amplifier 51 that computes the approximate third derivative, $D_3$, for the vertical adjustment of the high intensity zone 15 of the low-beam headlamp 12. The vertical computer amplifier 51 may be connected to a vertical aim indicator meter 52 and may also be connected to a lamp 55 and/or to a servo unit 56 which has a rotatable shaft to which a suitable adjusting tool, for example, a screw driver 57 may be connected.

Figure 15:
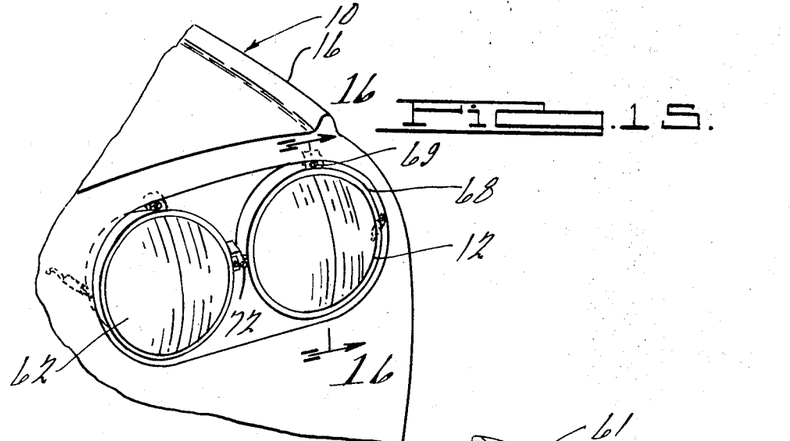
FIG. 15 is a front elevational view of one side of an automotive vehicle using a four headlamp system.
Figures 16, 17:
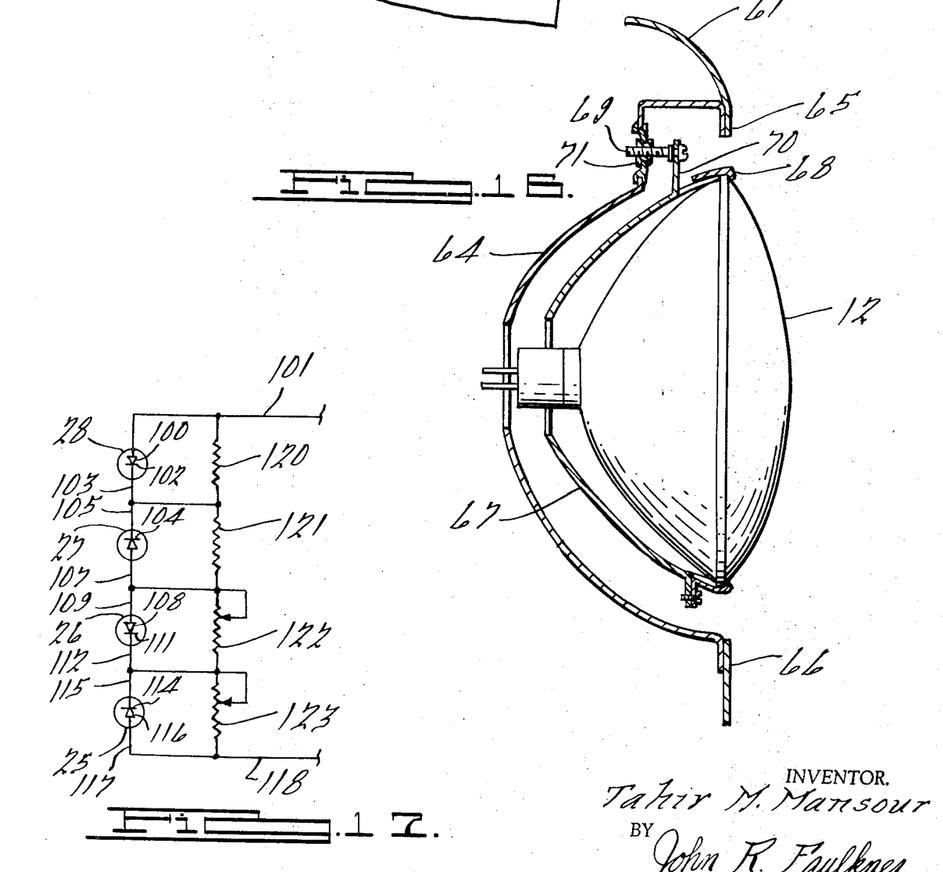
FIG. 16 is a sectional view through the low-beam headlamp taken along the line 16—16 of FIG. 15 showing the adjusting mechanism for this headlamp.
FIG. 17 is a circuit diagram of an embodiment of the computer portion of the horizontal and vertical computer amplifiers shown in FIG. 5 together with the photoreceptors shown in that figure.

FIG. 15 shows a fender 61 of an automotive vehicle that has mounted therein the low-beam headlamp 12 and the high-beam headlamp 62. Since this invention is concerned with the aiming of the low-beam headlamp 12 only, the description of the invention will be confined to that headlamp. A section of this headlamp is shown in FIG. 16 taken along the lines 16—16 of FIG. 15, and this shows the fender 61 having a lamp enclosing mounting structure 64 suitably affixed thereto at 65 and 66. The headlamp 12 has a frame 67 positioned at the rear of the lamp that grips the outer flange of the lamp at 68. A vertical adjusting screw 69 extends through the frame 67 at 70 and engages a nylon nut member 71 mounted in the mounting structure 64. The horizontal adjusting screw 72 shown in FIG. 15 also has the same construction. This is a standard lamp adjusting structure that need not be described in greater detail. Suffice it to say that when the adjusting screw 69 is rotated, the low-beam headlamp high intensity zone represented by the pattern 15 may be adjusted vertically on the headlamp aiming screen or target board 11, and when the horizontal adjusting screw 72, as shown, is rotated the low-beam intensity pattern 15 may be shifted laterally or horizontally on the headlamp aiming screen or target board 11.

Referring now to FIG. 17 there is shown a circuit which may be employed as the computer portion of the horizontal computer amplifier 41 and of the vertical computer amplifier 51. As can be seen here, the photoelectric or light sensitive devices 25, 26, 27 and 28 may comprise photovoltaic cells in the form of diodes that produce an output signal proportional to the intensity of light falling on them. This circuit is also used with the photoelectric or light sensitive diodes 31 through 34 arranged in the same order as photoelectric or light sensitive diodes 25 through 28.

The light sensitive device 28 has its anode 100 connected to a lead 101 and its cathode 102 connected to a lead 103. The light sensitive device 27 has its cathode 104 connected to a lead 105 and its anode 106 connected to a lead 107. The light sensitive device 26 has its anode 108 connected to a lead 109 and its cathode 111 connected to a lead 112. The light sensitive device 25 has its cathode 114 connected to a lead 115 and its anode 116 connected to a lead 117. The lead 117 is connected to an output lead 118. A resistor 120 is connected across the light sensitive device 28; a resistor 121 is connected across the light sensitive device 27; a variable resistor 122 is connected across the light sensitive device 26; and a variable resistor 123 is connected across the light sensitive device 25.

The resistors 121 and 122 are approximately three times the size of resistors 120 and 123, and the output voltage appearing across the leads 101 and 118 is the output of the computer that is applied to the amplifier in the horizontal and vertical computer amplifiers 41 and 51. It will be remembered that the output desired from this computer is the approximate third derivative represented by the equation $D_3 = I_1 - 3(I_2 - I_3) - I_4$. The voltage across resistor 120 represents the value $I_1$, the voltage across resistor 121 represents the value $I_2$, the voltage across the resistor 122 represents the value $I_3$, and the voltage across the resistor 123 represents the value $I_4$. With the light sensitive devices 25 through 28 connected with the polarity shown and with the value of the resistors having the ratios described above, that is, the value of resistors 121 and 122 having a value approximately three times that of resistors 120 and 123, it can be seen that the voltage across the leads 101 and 118 does indeed conform to the approximate third derivative $D_3$. The resistors 122 and 123 are made variable to balance out any tolerances in them and the light sensitive devices 25 through 28.

When the automotive vehicle in which the low-beam headlamp 12 has been mounted comes off the assembly line, it is driven into the position shown in FIG. 1 at the requisite 25' distance from the headlamp aiming screen or board 11. The headlamp aiming operator then makes a rough adjustment of the adjusting screws 69 and 72 to bring the low-beam high intensity zone represented by the pattern 15 into the general area of the photoreceptors or light sensitive transducers 25 through 28 and 31 through 34. The operator should during this rough adjustment bring the low-beam high intensity zone into the lower right-hand section of the aiming board shown in FIGS. 2 and 3.

The headlamp aiming operator may then properly adjust the low-beam high intensity zone by rotating the adjusting screws 69 and 72 so that this zone is brought up and to the left in the direction of the photoreceptors or light sensitive devices 25 through 28 and 31 through 34 until both the horizontal aim indicating meter 42 and the vertical aim indicating meter 52 register zero. In order to do this, it is necessary for him to turn the adjusting screws 69 and 72 so that the high intensity zone 15 of the light pattern from the low-beam headlamp scans the four horizontal and the four vertical light sensitive transducers or photoreceptors 25, 26, 27 and 28 and 31, 32, 33, and 34. When both the horizontal and vertical aim indicating meters register zero, the high-intensity zone 15 of the low-beam headlamp will be properly aimed since the approximate third derivative, $D_3$, will be zero for both the vertical and horizontal position of the edges of the high intensity zone 15 of the low-beam headlamp 12. This implies that the curve 39 will be positioned as shown in FIG. 9 in which the zero value of the curve is located at the vertical line 22, the position of the edge of a properly aimed low-beam light pattern. With respect to aiming in a vertical direction, the line 22 may be replaced on the curve 39 with the horizontal line 14.

In the alternative, the vertical and horizontal computer amplifiers 41 and 51 may be used in conjunction with the lamps 45 and 55 to provide proper manual adjustment of the low-beam headlamp. Thus, as the headlamp adjusting operator adjusts or scans the low-beam headlamps 12 in relation to the photoreceptors or light sensitive transducers 25 through 28 and 31 through 34 by turning the adjusting screws 69 and 72, the lamps 45 and 55 will turn on when the value of the approximate third derivative, $D_3$, reaches zero.

It can be appreciated also that the servo units 46 and 56 may be employed to properly adjust the high intensity zone 15 of the low-beam headlamp 12. The servo units include means for scanning across the horizontal light sensitive devices or photoreceptors 25 through 28 and the vertical light sensitive devices or photoreceptors 31 through 34 by turning the adjusting screws 69 and 72 from one extreme position to another extreme position. The servo units are constructed so that they turn in one direction when the approximate third derivative is positive, the other direction when the approximate third derivative is negative and will come to a stop when the approximate third derivative is zero. When the servo units 46 and 56 come to a stop, the high intensity zone 15 of the low-beam headlamps 12 will be in a properly adjusted position with the upper edge positioned along the line 14 as shown in FIGS. 1 through 3, and the left-hand edge positioned along the line 22 as shown in these figures.

Figures 10, 11, 12, 13, 14:
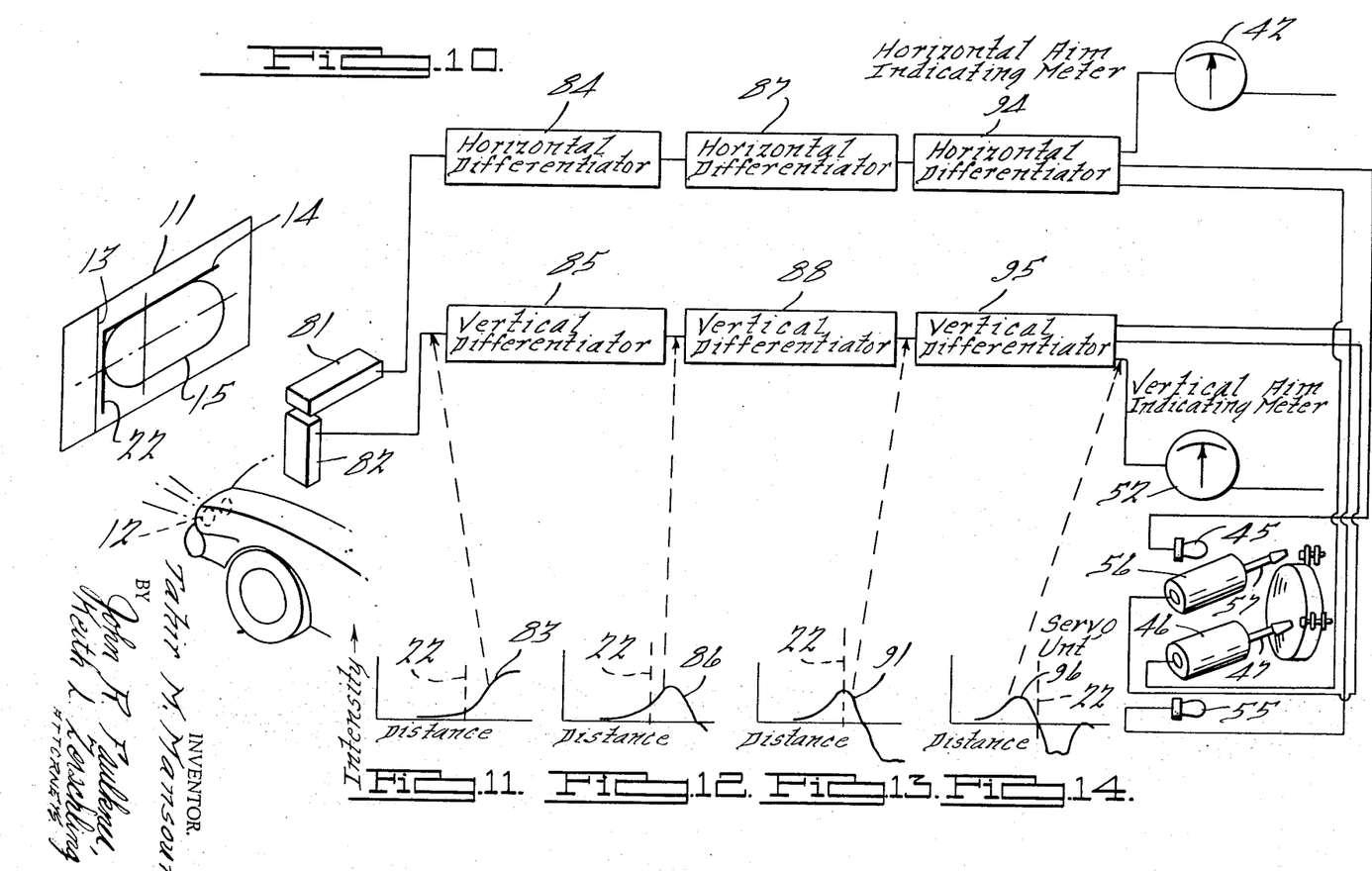
FIG. 10 is a block diagram or schematic of another embodiment of the invention in which the exact second derivative of light intensity with respect to distance may be employed to properly aim the low-beam headlamps of an automotive vehicle.
FIG. 11 is a plot of a light intensity curve from a headlamp versus distance and is similar to FIG. 6.
FIG. 12 is a plot of the first derivative of the light intensity curve of FIG. 11 and is similar to FIG. 7.
FIG. 13 is a plot of the second derivative of the light intensity curve of FIG. 11 and is similar to FIG. 8.
FIG. 14 is a plot of the third derivative of the light intensity curve of FIG. 11 and is similar to FIG. 9.

Referring now to FIG. 10, there is shown another embodiment of the invention which is in all respects identical to that shown in FIG. 5 except that other means are employed for deriving the third derivative of light intensity with respect to distance. In this embodiment, means are employed for deriving the exact third derivative rather than the approximate third derivative as denoted by the factor $D_3$.

As shown in FIG. 10, the headlamp aiming board 11 has marked thereon the horizontal line 14 that is a projection of the centerline of the low-beam headlamp 12 and the vertical line 22 positioned 2" to the right of the vertical projected centerline 13 of lamp 12. The horizontal line 14 and the vertical line 22 indicate where the edges of a properly aimed high intensity zone of a low-beam light pattern should be located.

Single line iconoscopes 81 and 82 are employed to scan the aiming board 11 in the position where the photoreceptor or light sensitive devices 25 through 28 and 31 through 34 were located in the embodiment of the invention shown in FIG. 5. The single line iconoscope 81 scans on a horizontal line located 7" below the horizontal line 14 and in the vicinity of the vertical line 22. The single line iconoscope 82, on the other hand, scans along a vertical line located 7" to the right of the vertical line 22 and in the vicinity of the horizontal line 14.

These single line iconoscopes will produce a signal representative of the intensity of the light sensed along the sensing lines with respect to distance as shown in the curve 83 of FIG. 11. The outputs from these single line iconoscopes 81 and 82 are fed to a first horizontal differentiator 84 and a first vertical differentiator 85, respectively. The outputs from the first horizontal differentiator 84 and the first vertical differentiator 85 are the first derivatives of the light intensity with respect to distance in the horizontal and vertical directions and are represented by the curve 86 shown in FIG. 12. The outputs from the first horizontal differentiator 84 and the first vertical differentiator 85 are fed to a second horizontal differentiator 87 and a second vertical differentiator 88, respectively, the outputs of which are the second derivatives of the intensity of the light sensed by the single line iconoscopes 81 and 82 with respect to the distance scanned. These second derivatives are represented by the curve shown in FIG. 13 and denoted by the numeral 93. The outputs from the second horizontal differentiator 87 and the second vertical differentiator 88 are fed to a third horizontal differentiator 94 and a third vertical differentiator 95, respectively, the outputs of which are the third derivatives of the light sensed by the single line iconoscopes 81 and 82 with respect to distance scanned. These third derivatives are represented by the curve 96 shown in FIG. 14.

Taking the horizontal portion of the system as an example, the dotted line shown on curves 83, 86, 91 and 96 is line 22, and it can be appreciated that the third derivative should be a minimum or zero at the line 22 for a properly aimed high intensity zone of a low-beam headlamp since this is the proper position for the edge of the properly aimed low-beam light pattern.

The remainder of the system is precisely the same as that described in FIG. 5, and the headlamps 12 may be adjusted to provide proper positioning of the low-beam light pattern by precisely the same apparatus and method as that described in the aiming of the headlamps in FIG. 5. In addition, it will be appreciated that a cathode ray tube could be used to display the third derivative curve 96 shown in FIG. 14 in relation to the fixed lines 22 and 14. When the curve 96 of the cathode ray tube displayed is, as shown in FIG. 14, in relation to line 22, or line 14 in the vertical aiming situation, the low-beam light pattern is properly aimed. The adjusting of the headlamp will, of course, shift the curve 96 with respect to the line 22 in horizontal adjustment or the line 14 in vertical adjustment.

Figure 18:
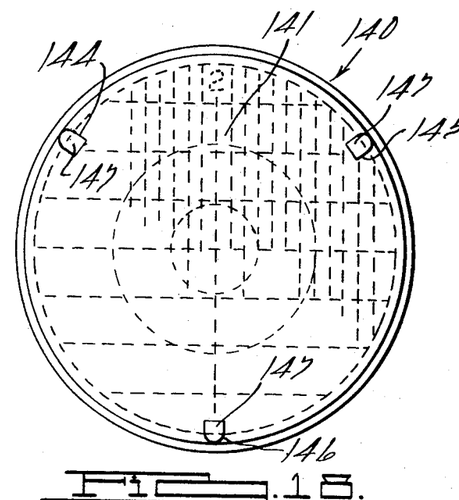
FIG. 18 is a front elevational view of a headlamp of an automotive vehicle.
Figure 19:
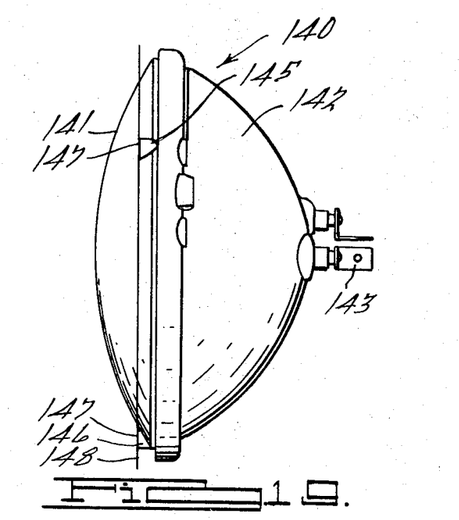
FIG. 19 is a side elevational view of a headlamp of an automotive vehicle.

Referring now to FIGS. 18 and 19, there is shown a low-beam headlamp 140 having a lens 141, a reflector 142 and electrical terminals 143 for energizing the filament of the lamp (not shown). The lens 141 has three integrally formed aiming pads 144, 145 and 146 positioned about the periphery thereof. The faces 147 of the aiming pads define an aiming plane 148 that should be normal to the photometer axis of the headlamp within certain specified tolerances.

As stated above, the present invention may be utilized to check or audit the location of the faces 147 of the aiming pads 144, 145, and 146. More particularly, it may be utilized to audit or check whether the aiming plane 148 is in a proper position with respect to the light pattern produced by the headlamp 140. If this plane is in the proper position, then the headlamp may be properly aimed in an automotive assembly line by means of a spot projector 150 shown in FIG. 20.

Figure 20:
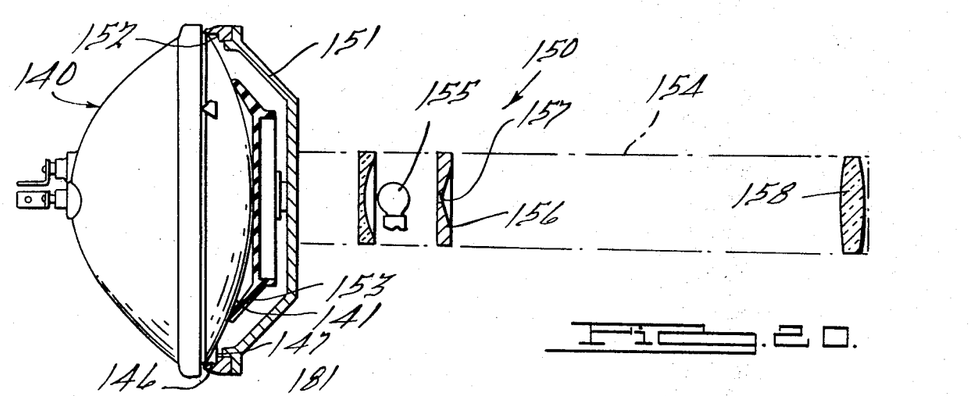
FIG. 20 is a sectional view partially in elevation of a headlamp with a mechanical aiming device in the form of a spot projection affixed to it.

The spot projector has a metallic annular structure 151 within an inner annular flange 152 which is seated against the faces 147 of the aiming pads 144, 145 and 146. This may be done by any suitable means, for example, by applying a vacuum to a flexible cup 153 that fits over the lens 141 of the lamp 140. A cylindrical light barrel 154 has a lamp 155 positioned at one end, an intermediate disc 156 with a central aperture 157 positioned therein and a lens 158. The axis of the barrel is positioned perpendicular to the inner annular flange 152 and passes through its center.

Figures 22, 23:
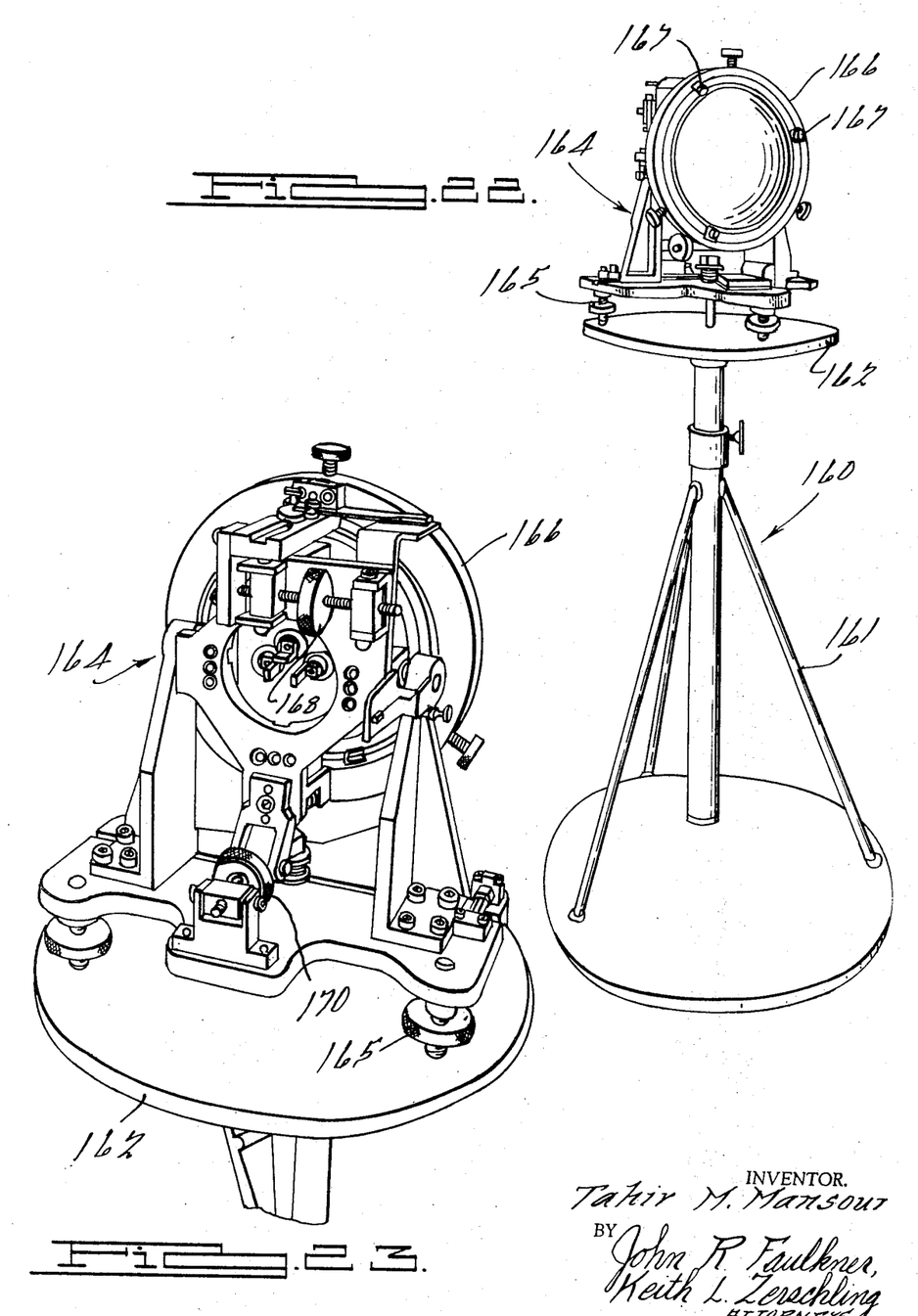
FIG. 22 is an elevational view of a stand, with a fixture for rotating a headlamp about its vertical and horizontal axes.
FIG. 23 is a rear elevational view of the fixture shown in FIG. 22.

The lamp may be mounted in any suitable fixture for checking or auditing purposes such that it can be tilted up and down and rotated left and right. For example, a fixture similar to the means for mounting the headlamps in the vehicle, such as that shown in FIG. 16 or 17, may be used. In the alternative, a fixture and stand 160 as shown in FIGS. 22 and 23 may be employed. This latter structure comprises a stand 161 having a platform 162 on which is mounted gimbals 164. The gimbals may be leveled on the platform 162 by means of leveling screws 165, and they include a ring 166 for receiving the headlamp 140. Clips 167 may be employed to hold the headlamp 140 in place in the retaining ring. Hand-operated thumbscrews 168 and 170 may be employed to rotate the headlamp to the left and right and up and down, respectively.

Figure 21:
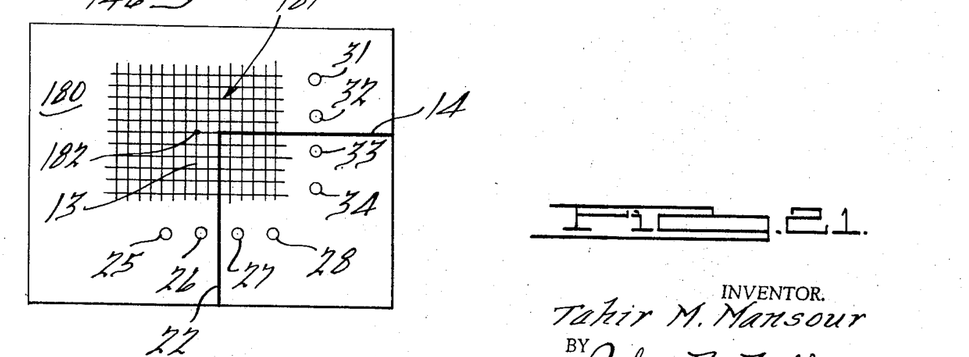
FIG. 21 is a front elevational view of a low-beam mechanical aiming target or audit board.

The fixture is positioned so that the headlamp is 25' from a target, auditing or aiming board just as it would be if it were to be aimed in an assembly plant. Such an audit or target board is shown at 180 in FIG. 21, and it includes the four light sensitive devices or photoreceptors 25 through 28 positioned on a horizontal line and the four light sensitive devices or photoreceptors 31 through 34 positioned on a vertical line as shown in FIG. 4, together with the lines 14 and 22. The target or auditing board also has a grid 181 of horizontal and vertical lines that define 1" squares. A mechanical aiming index mark or target 182 is positioned at the intersection of the lines 13 and 14 which is on a line projected from the center of the circle inscribed by three perfectly positioned aiming pads and normal to perfectly positioned faces 147 on the aiming pads that define a prefectly positioned aiming plane.

The headlamp 140 is then energized to illuminate the target or auditing board 180. The lamp is rotated and/or tilted by the fixtures described above until the indicating meters 42 and 52 shown in FIG. 5 read zero. The high intensity zone of the low-beam headlamp is now properly positioned with respect to the two target lines 14 and 22. The spot projector device 150 is then mounted on the face or lens 141 of headlamp 140 so that the inner annular flange 152 of the annular structure 151 is positioned against the faces 147 of the aiming pads 144, 145 and 146. The spot projector projects a 2" diameter circle of light on the target or auditing board 180 emanating from the center of the circle inscribed by the points on the three aiming pads and on a line which is perpendicular to the aiming plane 148 defined by the faces 147 of the aiming pads.

If the faces of the aiming pads are properly positioned, this circle of light should fall upon the mechanical aiming index or target 182 or within a specified maximum distance from it. For example, if the spot falls on the index or target or within 2" to the right or left of it or within 1½" above or below it, the faces 147 of the aiming pads are located in a satisfactory position so that the lamp may be mechanically aimed on the automotive assembly line by the spot projector 150 or other mechanical aiming means.

The spot projector device 150 is fixed to the lamp on the assembly line of the plant and aimed at a target board having the aiming index or target 182 located on it in the same position as this mark on the audit or target board 180. The headlamp 140 is then adjusted in the vehicle by manually turning the adjusting screws 69 and 72, as shown in FIG. 15, until the 2" spot of light previously described in centered or the index or target 182. The headlamp is then properly aimed.

If, in the above described checking test the spot of light from the spot projector 150 falls on the audit or target board so that it is not within the specified distances from the index or target 182, the faces 147 of the aiming pads 144, 145 and 146 are not properly positioned. The manufacturer of the bulb may then grind the faces of the aiming pads so that they are in the correct position as evidenced by a re-running of the above described test. The headlamp manufacturer may also change or alter his manufacturing procedure to obtain better quanlity control of the positioning of the faces of the aiming pads.

The test methods outlined above may be used by a lamp manufacturer on a statically basis to test a statistical sample of headlamp bulbs that are manufactured and supplied to automotive companies for use in automotive vehicles and that are to be aimed on the automotive production line by mechanical aiming devices, such as, the mechanical-optical device described above.

The automobile manufacturer could also use the above mentioned test to test a statistical sample of headlamps received from a supplier to determine whether the faces of the headlamp aiming pads are in a proper position for mechanical aiming.

The invention thus provides an accurate and time saving system and method for aiming properly the low-beam headlamp of an automotive vehicle. In the invention, the operator of the headlamp aiming system need take only a fraction of the time to aim the headlamps that he previously took by the visual aiming method. This is true since he merely needs to observe instruments or lights in the case where the servo units are not employed or in the case in which they are employed, the adjustment may be done automatically.

The present invention provides a particularly inexpensive and time saving method for properly aiming the low-beam headlamps of an automotive vehicle. As pointed out above, the headlamps are properly aimed when the third derivative of light intensity with respect to distance scanned is zero at a particular position on the headlamp aiming board. The operator only need to roughly adjust the high intensity zone of the low-beam headlamps in a position on the board which is fairly remote from the light sensitive devices. As he scans the high intensity zone over these light sensitive devices, he will get a zero reading on his meter or other visual indicator at some position. This tells him that the headlamps are properly aimed since the third derivative or approximate third derivative with respect to distance scanned is zero.

There is no need with the system of this invention to scan the light pattern to seek a maximum or a minimum, to store this maximum or minimum and then scan in the reverse direction until this maximum or minimum again is reached. When the zero reading is achieved on the indicator, the headlamps are properly aimed.

Similarly, with respect to the automatic aiming of headlamps with servo units, only one scan is necessary and the servo units will come to a stop when the third derivative or approximate third derivative with respect to distance scanned is zero so that there is zero input into the servo units.

As pointed out earlier in the specification, the present invention may also be used to check the precise position of aiming pads on a headlamp bulb in the plant of a manufacturer of headlamps. This serves as a quality control check on headlamps that are to be mechanically aimed by means of these pads in automotive assembly plants.

It is to be understood that this invention is not to be limited to the exact construction shown and described, but that various changes and modifications may be made without departing from the spirit and scope of the invention as defined in the appended claims.

What is claimed is:

1. In a headlamp aiming system for aiming the low-beam light pattern of an automotive vehicle headlamp the combination comprising, a headlamp aiming board for receiving the low-beam light pattern of the headlamp and including a defined location at which an edge of the high intensity zone of the light pattern of a properly aimed low-beam headlamp is to be positioned, the headlamp including means for permitting the edge of the high intensity zone of the low-beam light pattern to be scanned over said defined location, and means referenced with respect to said defined location for producing electrical signals representative of the intensity of the light adjacent said defined loction as the edge of the high intensity zone of the low-beam light pattern is scanned over said defined location, and means coupled to said last mentioned means for computing the third derivative of said electrical signals which is representative of the third derivative of the light intensity at said defined location with respect to the scanned distance, and means coupled to said last mentioned means for indicating when said third derivative is zero.

2. The combination of claim 1 in which means referenced with respect to said defined location comprises, scanning and sensing means scanning the headlamp aiming board in a direction substantially perpendicular to the edge and across said defined location and sensing light intensity as a function of the distance scanned.

3. In a headlamp aiming system for aiming the low-beam light pattern of an automotive vehicle headlamp the combination comprising, a headlamp aiming board for receiving the low-beam light pattern of the headlamp and including a defined location at which an edge of the high intensity zone of the light pattern of a properly aimed low-beam headlamp is to be positioned, the headlamp including means for permitting the edge of the high intensity zone of the low-beam light pattern to be scanned over said defined location, and means referenced with respect to said defined location for producing electrical signals representative of the intensity of the light adjacent said defined location as the edge of the high intensity zone of the low-beam light pattern is scanned over said defined location, and means coupled to said last mentioned means for computing the approximate third derivative of said electrical signals which is representative of the approximate third derivative of the light intensity at said defined location with respect to the scanned distance, and means coupled to said last mentioned means for indicating when said approximate third derivative is zero.

4. The combination of claim 3 in which said means referenced with respect to said defined location for producing electrical signals comprises, four light sensitive devices mounted on a line substantially perpendicular to an edge of the high intensity zone of a properly aimed low-beam light pattern, and in which means for computing the approximate third derivative of said electrical signals is coupled to said four light sensitive devices.

5. The combination of claim 4 in which said means for computing the approximate third derivative of said electrical signals includes means for subtracting the signal produced by light sensitive device receiving the least light intensity from the signal produced by the light sensitive device receiving the greatest light intensity, subtracting three times the signal produced by the light sensitive device positioned adjacent the light device receiving the greatest light intensity and adding three times the signal produced by the light sensitive device positioned adjacent the light sensitive device receiving the least light intensity when the edge of the high intensity zone of the low beam light pattern is positioned within a given distance of said defined location.

6. In a headlamp aiming system for aiming the low-beam light pattern of an automotive vehicle headlamp the combination comprising, a headlamp aiming board for receiving the low-beam light pattern of the headlamp and including a line at which an edge of the high intensity zone of the low-beam light pattern of a properly aimed headlamp is to be positioned, a set of four light sensitive transducers positioned at said headlamp aiming board to receive light from the low-beam light pattern of the headlamp, said four light sensitive transducers being positioned on a line substantially perpendicular to the edge of the high intensity zone, said line being positioned between the two innermost light sensitive transducers, the headlamp being capable of adjustment so that a portion of the high intensity zone of the low-beam light pattern adjacent said edge may be scanned across said four light sensitive transducers, means coupled to said four light sensitive transducers for computing the approximate third derivative of the light intensity incident upon said four light sensitive transducers with respect to distance along said four light sensitive transducers, and means coupled to said last mentioned means for indicating when the approximate third derivative reaches zero.

7. The combination of claim 6 in which said means coupled to said four light sensitive transducers for computing the approximate third derivative of the light intensity with respect to distance of light incident upon said four light sensitive transducers includes means for subtracting the signal produced by the outermost light sensitive transducer that receives the least light when said edge of said high intensity zone is properly positioned from the signal produced by the outermost light sensitive transducer that receives the greatest amount of light when said edge is properly positioned, and subtracting three times the difference of the signal produced by the innermost light sensitive transducer positioned adjacent said last mentioned light sensitive transducer and the innermost light sensitive transducer positioned adjacent the first mentioned light sensitive transducer.

8. An apparatus for aiming the low-beam light pattern of an automotive vehicle headlamp comprising, a vehicle body, a headlamp supported in said vehicle body, a headlamp aiming board for receiving the light pattern of the headlamp and including a line at which an edge of the high intensity zone of the light pattern of a properly aimed low-beam headlamp is to be positioned, means coupling said headlamp and said vehicle body for permitting the headlamp to be movably adjusted with respect to said vehicle body such that the low-beam light pattern in the vicinity of the edge of the high intensity zone of the low-beam light pattern may be scanned over said line, and means referenced with respect to said line for computing the third derivative of the light intensity in the vicinity of said line with respect to the distance scanned, and the means engaging said first mentioned means and coupled to said last mentioned means for automatically adjusting the headlamp to bring said third derivative to a zero value at said line.

9. The combination of claim 8 in which said means for automatically adjusting the headlamp includes a servo unit coupled to said second mentioned means and including an adjusting tool engaging said first mentioned means, said servo unit including means for scanning said light pattern from one position to another position over said line and for bringing said adjusting tool to a rest position when the value of said third derivative reaches zero.

10. An apparatus for aiming the low-beam light pattern of an automotive vehicle headlamp comprising, a vehicle body, a headlamp supported in said vehicle body, a headlmp aiming board for receiving the light pattern of the headlamp and including a line at which an edge of the high intensity zone of the light pattern of a properly aimed low-beam headlamp is to be positioned, means coupling said headlamp and said vehicle body for permitting the headlamp to be movably adjusted with respect to said vehicle body such that the low-beam light pattern in the vicinity of the edge of the high intensity zone of the low-beam light pattern may be scanned over said line, and means referenced with respect to said line for computing the approximate third derivative of the light intensity in the vicinity of said line with respect to the distance scanned, and the means engaging said first mentioned means and coupled to said last mentioned means for automatically adjusting the headlamp to bring said approximate third derivative to a zero value at said line.

11. The combination of claim 10 in which four light sensitive transducers are positioned along a line substantially perpendicular to and intersecting said first mentioned line, with said line being positioned between the two inner light sensitive transducers of said four light sensitive transducers, and said means for computing the approximate third derivative is coupled to said four light sensitive transducers for computing the approximate third derivative of the light intensity incident thereon with respect to distance along said line on which said four light sensitive transducers are located.

12. The combination of claim 11 in which said means for automatically adjusting the headlamp to bring said approximate third derivative to a zero value at said line comprises, a servo unit coupled to said last mentioned means and including an adjusting tool engaging said first mentioned means, said servo unit including means for scanning said light pattern from one position to another position over said first mentioned line and for bringing said adjusting tool to a rest position when the value of said approximate third derivative reaches zero.

13. Apparatus for positioning a light pattern of a headlamp on a headlamp target board, comprising a line positioned on the headlamp target board defining the position of an edge of the high intensity zone of the light pattern of a low-beam headlamp when said high intensity zone is properly positioned on the target board, means mounting said headlamp for permitting movement of the high intensity zone of the light pattern on the target board, means mounted on the headlamp target board in a predetermined position with respect to said line for sensing the intensity of light along a direction substantially perpendicular to said line, means coupled to said last mentioned means for computing the approximate third derivative of light intensity with respect to distance in a direction substantially perpendicular to said line and means coupled to said means for computing the approximate third derivative for indicating the value of the approximate third derivative.

14. The combination of claim 13 in which said means for sensing the intensity of light comprise four equally spaced light sensitive devices mounted on the target board on a line substantially perpendicular to said first mentioned line in a position where said first mentioned line is positioned midway between the two innermost and the two outermost light sensitive devices.

15. The combination of claim 14 in which said approximate third derivative of light intensity with respect to distance along said second mentioned line is defined by the quantity $I_1-3(I_2-I_3)-I_4$ where $I_1$ represents the intensity of light incident on the light sensitive device receiving the highest light intensity, $I_2$ represents the intensity of light incident on the light sensitive device receiving the next to highest light intensity, $I_4$ represents the intensity of light incident on the light sensitive device receiving the lowest light intensity, and $I_3$ represents the intensity of light incident on the light sensitive device receiving the next to lowest light intensity when the high intensity zone is properly positioned on the target board.

16. A method of aiming the low-beam light pattern of an automotive vehicle comprising, focusing the low-beam pattern on an aiming board, and adjusting the low-beam pattern on the aiming board to bring the third derivative of the light intensity along an edge of the high intensity zone of the light pattern with respect to distance measured in a direction substantially perpendicular to the edge to a zero value at a region on the aiming board that marks the position of the edge of a properly aimed low-beam headlamp pattern.

17. The method of claim 16 including adjusting the low-beam pattern on the aiming board in two mutually perpendicular directions, bringing the third derivative of the light intensity along a horizontal edge of the high intensity zone of the light pattern with respect to distance measured along a vertical line perpendicular to the horizontal edge to a zero value at a line on the aiming board that marks the position of the horizontal edge of a properly aimed low-beam headlamp pattern, and bringing the third derivative of the light intensity along a vertical edge of the high intensity zone of the light pattern with respect to distance measured along a horizontal line perpendicular to the vertical edge to a zero value at a line on the aiming board that marks the position of the vertical edge of a properly aimed low-beam headlamp pattern.

18. A method of aiming the low-beam light pattern of an automotive vehicle comprising, focusing the low-beam pattern on an aiming board, and adjusting the low-beam pattern on the aiming board to bring the approximate third derivative of the light intensity along an edge of the high intensity zone of the light pattern with respect to distance measured in a direction substantially perpendicular to the edge to a zero value at a region on the aiming board that marks the position of the edge of a properly aimed low-beam headlamp pattern.

19. The method of claim 18 including adjusting the low-beam pattern on the aiming board in two mutually perpendicular directions, bringing the approximate third derivative of the light intensity along a horizontal edge of the high intensity zone of the light pattern with respect to distance measured along a vertical line perpendicular to the horizontal edge to a zero value at a line on the aiming board that marks the position of the horizontal edge of a properly aimed low-beam headlamp pattern, and bringing the approximate third derivative of the light intensity along a vertical edge of the high intensity zone of the light pattern with respect to distance measured along a horizontal line perpendicular to the vertical edge to a zero value at a line on the aiming board that marks the position of the vertical edge of a porperly aimed low-beam headlamp pattern.

20. A method of checking the mechanical aimability of an automobile low beam headlamp having a lens with a plurality of aiming pads positioned about the periphery thereof and having faces defining an aiming plane, comprising placing said headlamp in a fixture which is capable of rotating the lamp about both a horizontal and a vertical axis, projecting the low-beam pattern on a target board having a horizontal and a vertical line positioned where the edges of a properly aimed low high intensity zone of a low beam light pattern are positioned, computing the approximate third derivative of the light intensity of the high intensity zone of the low beam pattern by means positioned on said target board in a predetermining location with respect to said vertical and horizontal lines, rotating the lamp in the fixture about both the horizontal and vertical axes until the approximate third derivatives of the light intensity with respect to distance along lines perpendicular to the horizontal and vertical lines is zero, placing a mechanical aiming device on the face of the aiming pads and determining through said mechanical aiming device whether a line projected through the center of a circle encircled by identically positioned points on the aiming pads and perpendicular to the aiming plane defined by the faces of the aiming pads falls within a given maximum distance of a predetermined position on the aiming board defined by lines normal to a perfectly located aiming plane and through the center of a circle inscribed by identically positioned points on perfectly located aiming pads.

References Cited

UNITED STATES PATENTS

| | | |
|---|---|---|
| 2,977,843 | 4/1961 | Graeber et al. |
| 3,386,333 | 6/1968 | Preston. |
| 3,467,473 | 9/1969 | Preston. |

RONALD L. WIBERT, Primary Examiner

P. K. GODWIN, JR., Assistant Examiner

U.S. Cl. X.R.

250—201; 356—122, 153, 154